Aug. 7, 1962 — M. A. POWERS — 3,048,163
COUNTERBALANCED HUMIDIFIER
Filed Sept. 16, 1958 — 5 Sheets-Sheet 1

INVENTOR
MILTON A. POWERS
ATTORNEYS

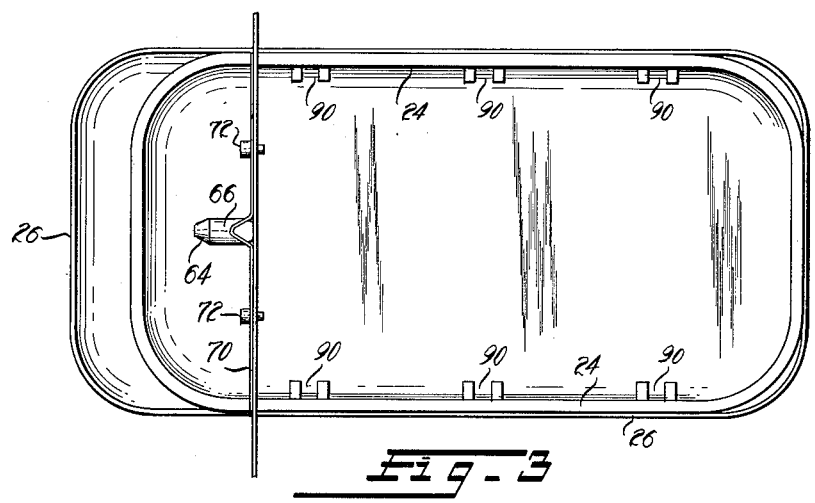
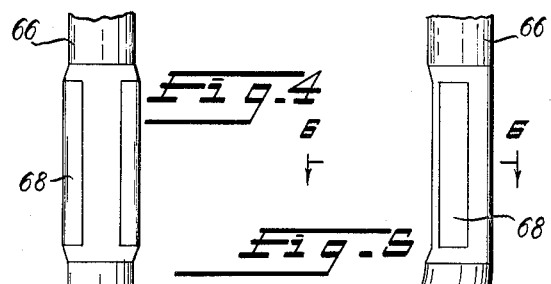
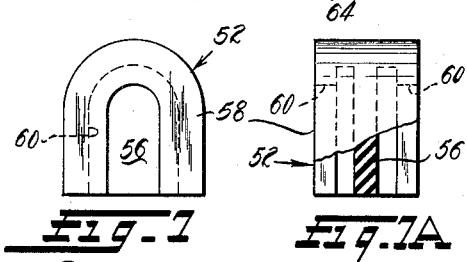
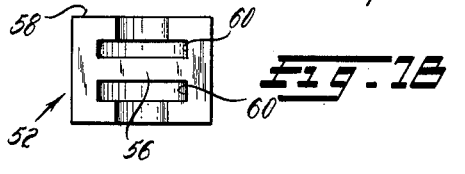
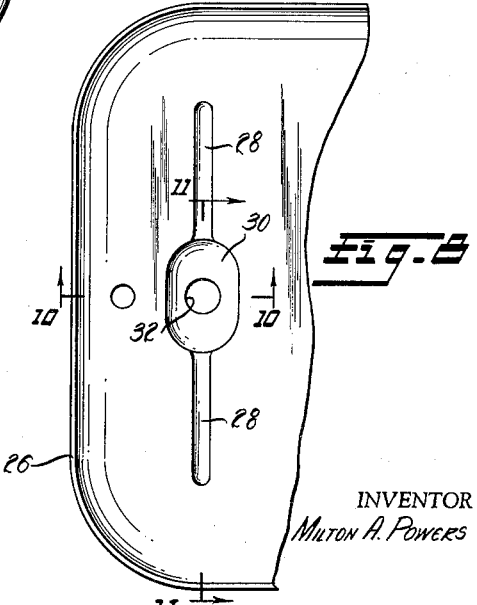

Aug. 7, 1962    M. A. POWERS    3,048,163
COUNTERBALANCED HUMIDIFIER
Filed Sept. 16, 1958    5 Sheets-Sheet 3
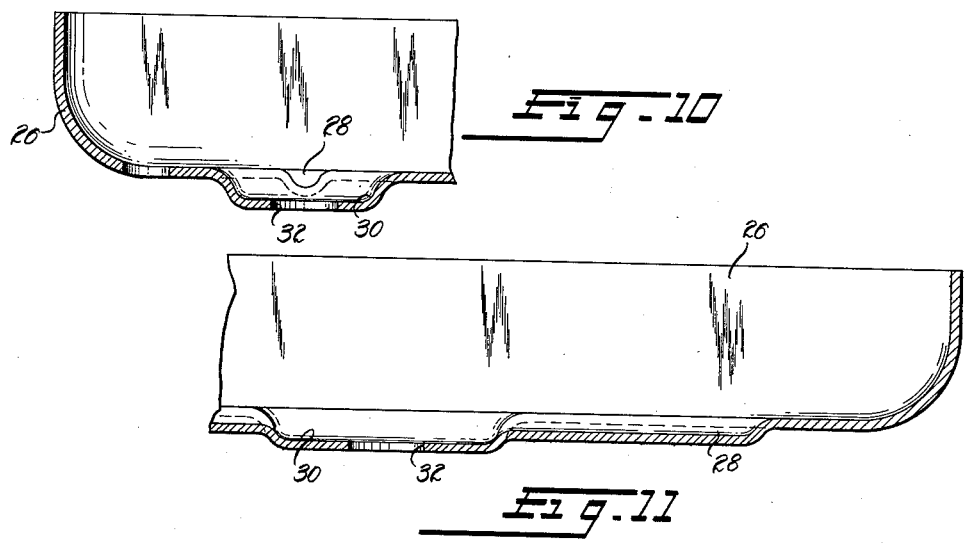
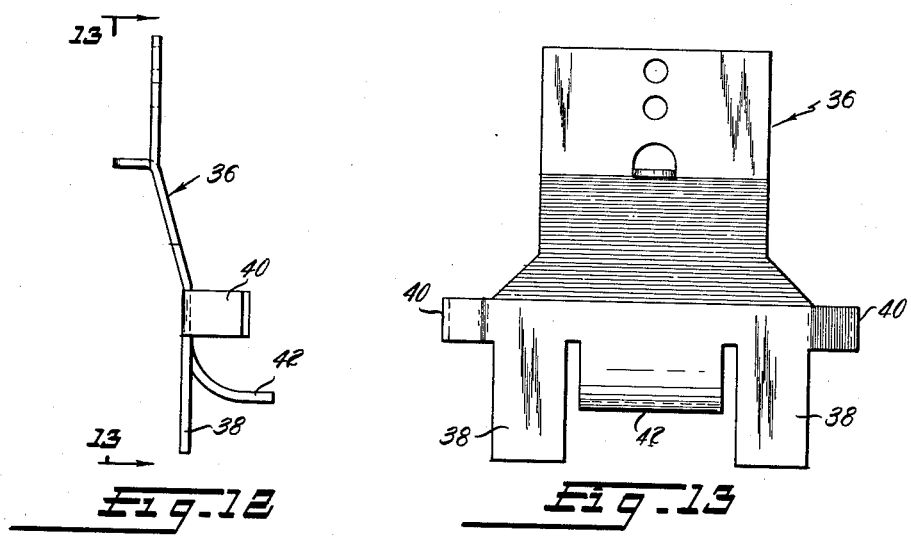
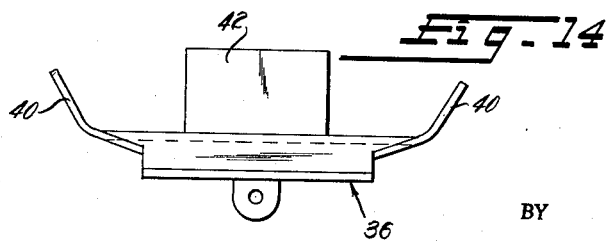
INVENTOR
MILTON A. POWERS
BY
Strauch, Nolan + Neale
ATTORNEYS

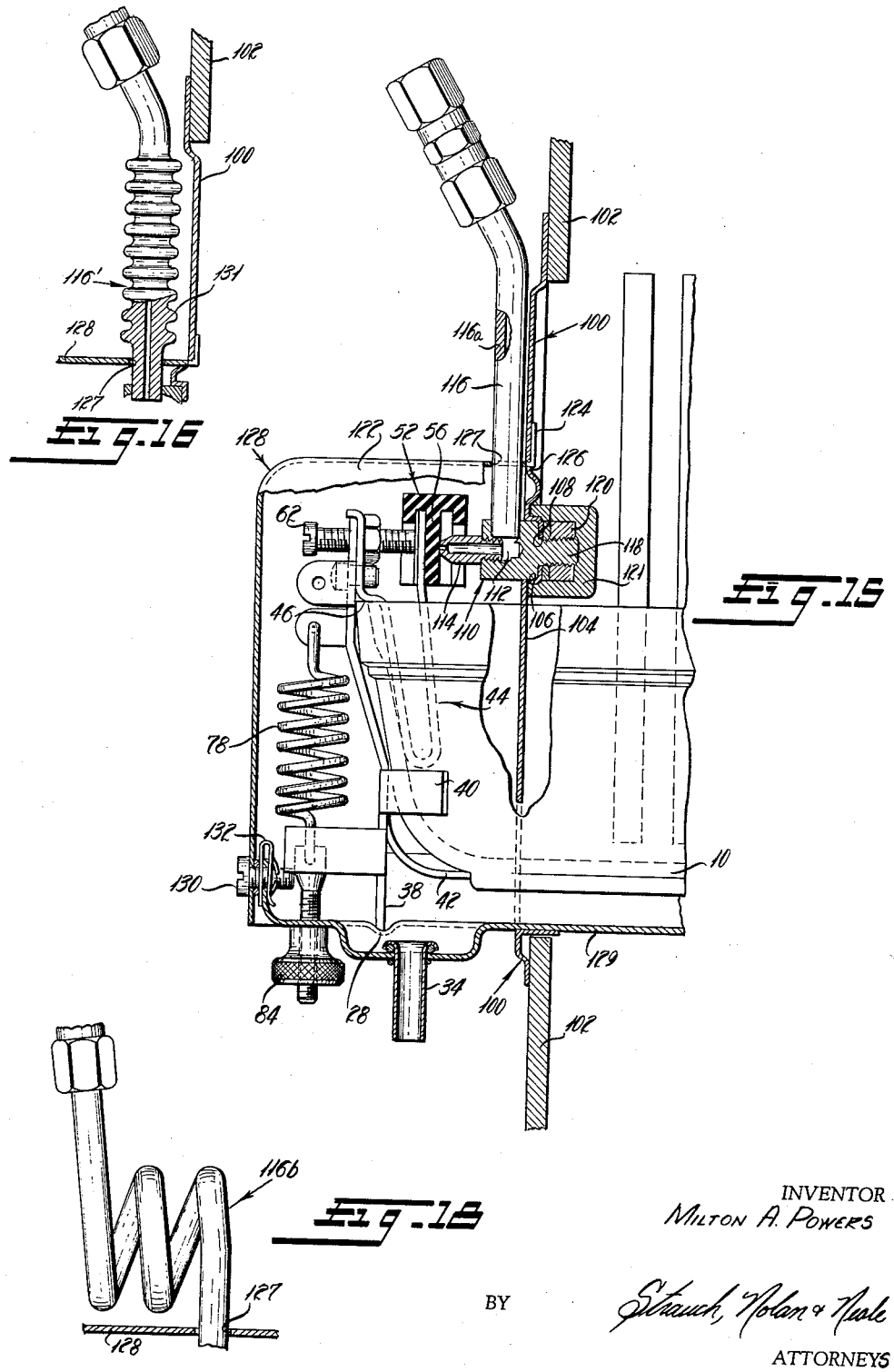

United States Patent Office 3,048,163
Patented Aug. 7, 1962

3,048,163
COUNTERBALANCED HUMIDIFIER
Milton A. Powers, Grosse Pointe, Mich., assignor to Skuttle Manufacturing Co., Milford, Mich., a corporation of Michigan
Filed Sept. 16, 1958, Ser. No. 761,314
16 Claims. (Cl. 126—113)

This invention relates to humidifiers and more particularly to automatically refillable counterbalanced humidifiers adapted to be mounted in a wall aperture of a plenum chamber or duct of a hot air heating system and the like.

Many types of humidifiers have been proposed for use in hot air heating systems. Humidifiers in modern hot air heating systems are usually located in the plenum chamber of the hot air furnace or in the main duct leading from the furnace. It is desirable that these humidifiers be automatically refillable with water to a predetermined level from a constant water source, the water-flow being automatically controlled by water-level responsive valve means. Such automatically refillable humidifiers are usually complicated to manufacture, install, and service. Also, the necessary adjustments thereon are usually difficult to make and maintain satisfactorily.

With the foregoing considerations in view, a primary object of this invention is to provide an improved automatically refillable humidifier of the type having a receptacle such as a reservoir pan tiltable in response to the water level therein to control flow from a water source, the humidifier having embodied therein novel features for simplified and more economical manufacture, easier adjustment and maintenance, and trouble-free operation.

Another object is to provide a novel humidifier construction which may be installed in areas subject to wide fluctuations in water pressure and which will operate reliably within narrow limits of water level in the reservoir and without overflow under extremely high water pressures so encountered.

Another object is to provide a novel humidifier construction with all operating parts located within the heated air zone of the furnace or duct yet which remain unaffected by said heat which heretofore has caused precipitation of lime within the valve member and water line connections resulting in failure in operation.

Another object is to provide a novel resilient valve seat member which is easily accessible for inspection, may be progressively positioned to present a multiplicity of new valve surfaces as wear occurs, and is provided with integral flanges which serve both to retain the member in a controlled position and also deflect water spray from the nozzle downward into the reservoir.

Other objects and advantages of the invention will become apparent from the following detailed description and drawings, in which:

FIGURE 3 is a top plan view of the water reservoir pan, overflow pan, and water nozzle of FIGURE 1, other parts being omitted for clarity;

FIGURE 4 is an end elevation of the water nozzle used in this invention;

FIGURE 5 is a side elevation of the water nozzle illustrated in FIGURE 4;

FIGURE 6 is a view taken along the line 6—6 of FIGURE 5;

FIGURES 7, 7A and 7B are front elevation, and elevation and bottom views respectively of the resilient valve seat member used in this invention;

FIGURE 8 is a top plan view, of one end of the water reservoir pan used in this invention;

FIGURE 9 is a side elevation of the water reservoir pan illustrated in FIGURE 8;

FIGURE 10 is a view taken along the line 10—10 of FIGURE 8;

FIGURE 12 is a side elevation of the support bracket used in this invention;

FIGURE 13 is a view taken along the line 13—13 of FIGURE 12;

FIGURE 14 is a top plan view of the support bracket illustrated in FIGURES 12 and 13;

FIGURE 15 is an enlarged longitudinal vertical sectional view similar to FIGURE 1 but illustrating another embodiment of the invention;

FIGURE 16 is a fragmentary view in section showing a special finned tube for water inlet;

FIGURE 17 is a graph comparing performance of the invention with other tilt-type humidifiers; and FIGURE 18 is a fragmentary view showing a coiled tube.

Figure 1:
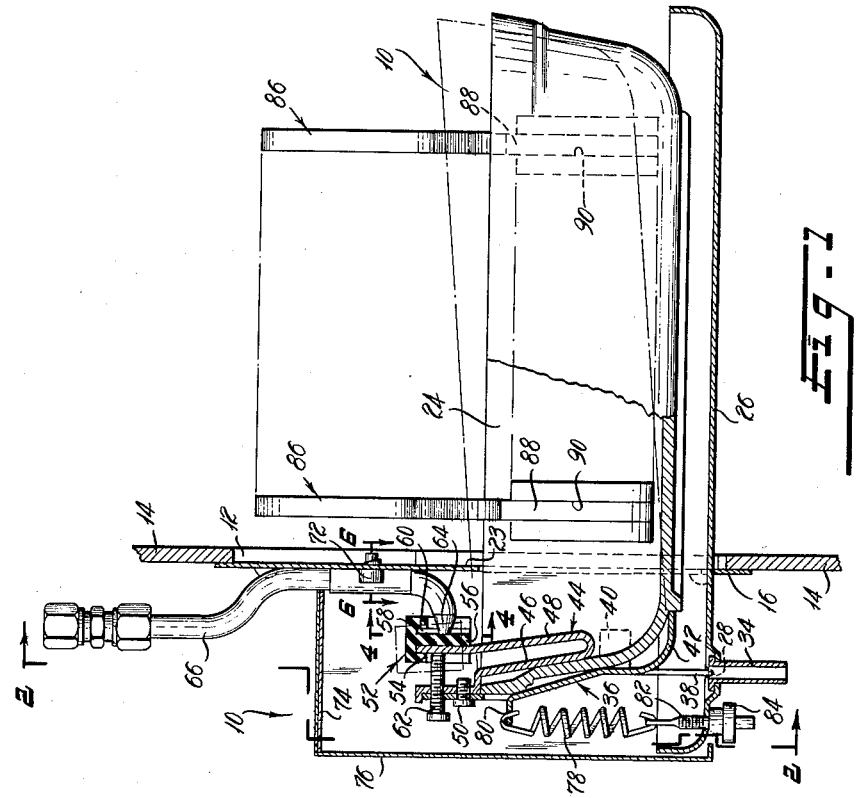
FIGURE 1 is a longitudinal vertical sectional view of the humidifier of this invention mounted in the wall of a plenum chamber or air duct of a hot air furnace.
Figure 2:
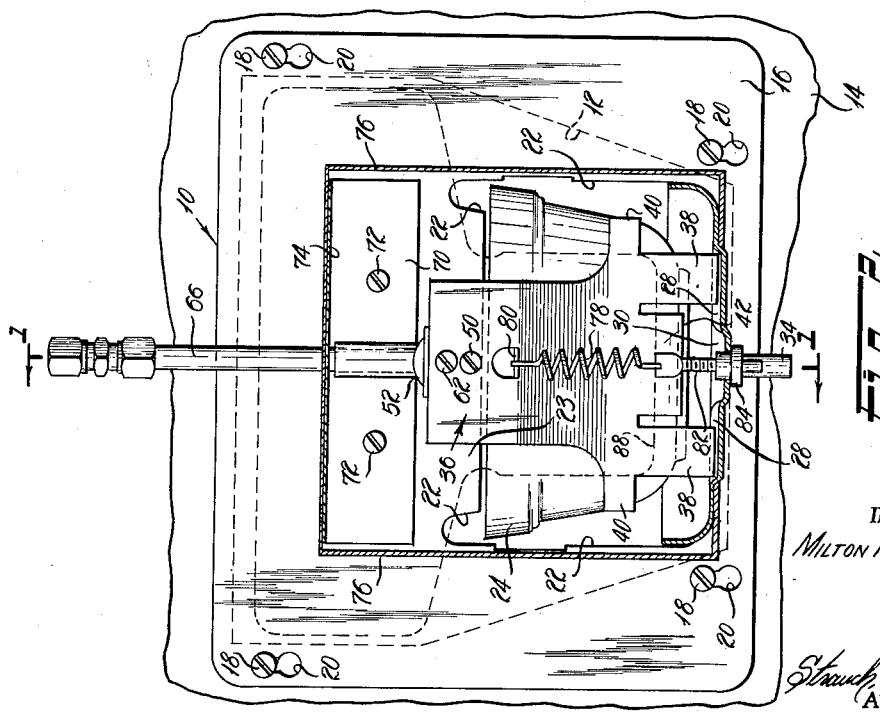
FIGURE 2 is a view taken along the line 2—2 of FIGURE 1.
Figure 11:
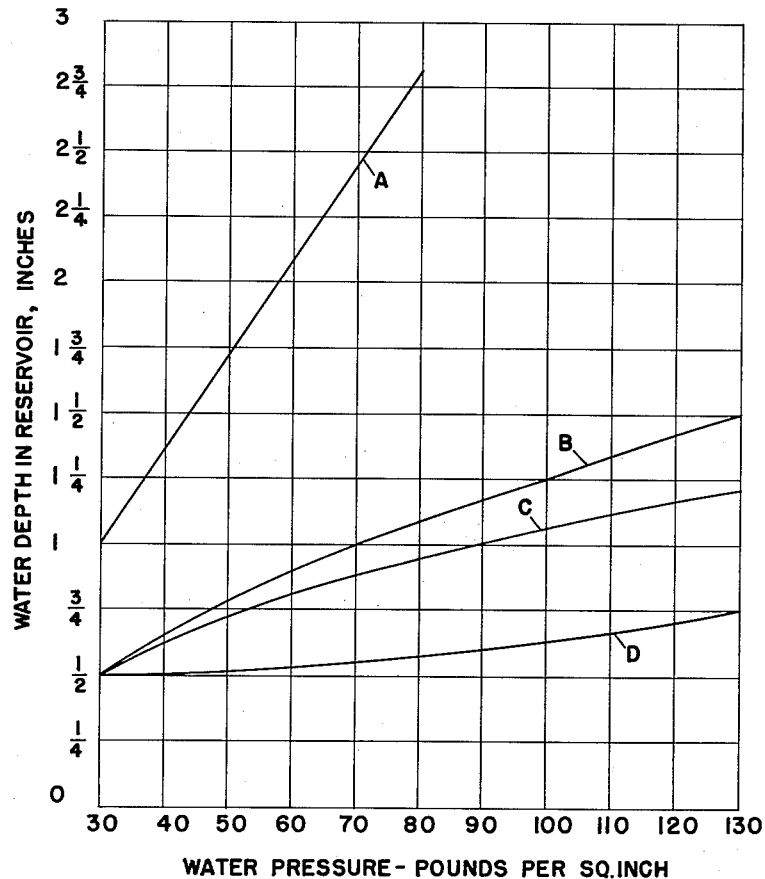
FIGURE 11 is a view taken along the line 11—11 of FIGURE 8.

Referring now more specifically to the drawings, there is illustrated in FIGURES 1 and 2 the humidifier assembly of this invention indicated generally at 10 mounted in an aperture 12 through the wall 14 of a plenum chamber or hot air duct of a hot air furnace by means of an adaptor plate 16 rigidly attached to wall 14 by screws 18 extending through key slots 20. Through the combination of key slots and screws illustrated, adaptor plate 16 can be readily mounted on the wall 14 by positioning the round portion of key slots 20 over the heads of screws 18 and moving the plate downwardly until the narrow portions of the key slots are behind the screw heads, whereupon the screws are tightened to rigidly clamp adaptor plate 16 to wall 14. For removal of the assembly, the foregoing mounting procedure is simply reversed.

Adaptor plate 16 has a cut-out section indicated generally at 22 which is of substantially U-shaped configuration, the portion of the adaptor plate remaining adjacent the inside of cut-out section 22 forming a downwardly extending shield 23. A generally rectangular water reservoir pan 24, preferably of heat resistant glass or other non-corrosive material, fits through cut-out section 22 and has one end thereof detachably mounted on a tiltable support bracket to be described hereinafter. The shield 23 is thus disposed transversely across the inside of water reservoir pan 24 and extends downwardly to a position closely adjacent the normal water level in the pan. An overflow pan 26 fitting in the bottom of cut-out section 22 and extending for a major portion of its length into the plenum chamber or air duct is rigidly secured to adaptor plate 16 by welds or other suitable means. Formed in the bottom of overflow pan 26 are elongated mounting grooves 28 (for mounting the support bracket) disposed in generally parallel relation to adaptor plate 16 and leading to a sump 30 having a drain opening 32 in which there is inserted an overflow grommet 34 adapted to receive a length of tubing (not shown) for conducting overflow water to a suitable location for each installation.

A substantially vertical support bracket indicated generally at 36 and having legs 38 supported in the grooves 28 is pivotally or tiltably mounted in the bottom of overflow pan 26. The support bracket 36 has outwardly extending spaced side arms 40 and bottom arm 42 disposed below and between the side arms 40, the arms being adapted to receive and support the sides and bottom respectively of reservoir pan 24 as shown in FIGURES 1 and 2.

A generally U-shaped spring clip indicated at 44 and having legs 46 and 48 has its leg 46 secured to the upper end of support bracket 36 by a screw 50 so that an end of reservoir pan 24 can be securely clamped between support bracket 36 and leg 46 when screw 50 is tightened as shown in FIGURES 1 and 2.

A valve seat member indicated generally at 52 of rubber or like resilient material is slidably mounted on the upper end of a tongue 54 formed on leg 48. The valve seat member 52 has a center planar section 56, opposite sides of which form valve seating surfaces. Extending outwardly on opposite sides from the planar section forming the valve seating surfaces are generally inverted U-shaped hoods 58 having grooves 60 on the under side thereof adjacent the center planar section 56 which are adapted to slidably receive tongue 54. With tongue 54 in either of the grooves 60, the opposite side of the center planar section 56 forms a valve seating surface, thus making the valve seat member 52 reversible. In addition, contact friction between tongue 54 and the rubber valve member allows the valve seat to be positioned vertically, thus providing several fresh valve surfaces to be exposed on each side, by simple adjustment from time to time. A desired space between legs 46 and 48 is maintained by a screw 62 threaded through upper portion of bracket 36 and leg 46 to abut against tongue 54, adjustment of which will be described in more detail hereinafter.

The weight of water reservoir pan 24 and its contents causes support bracket 36 to tilt in a direction to move the seating surface of valve seat member 52 against the discharge end of a horizontally disposed nozzle 64 at the end of a constant source water supply pipe 66. The nozzle 64 is swaged to a conical shape and partially closed to provide a desired reduction in size of heavy walled pipe 66. A valve (not shown) may be provided in the pipe 66 to limit the maximum velocity from nozzle 64 as desired. A portion of the pipe 66 has a triangular cross-sectional configuration as indicated at 68 so that pipe 66 may be rigidly and flatly clamped against adaptor plate 16 by a bracket 70 secured to adaptor plate 16 by screws 72. Bracket 70 has a flange portion 74 disposed substantially at right angles to adaptor plate 16 to support a removable cover 76, the sides of which fit flush against adaptor plate 16 to house that portion of the humidifier assembly 10 which extends out the aperture 12 of wall 14.

A coiled tensioned counterbalance spring 78, having one end connected to an ear 80 on support bracket 36 and an opposite end connected to the end of a bolt 82 extending through the bottom of overflow pan 26 and held in position by a nut 84, biases support bracket 36 in a tilting direction to the valve seat member 52 away from the nozzle 64 when water in reservoir pan 24 falls below a predetermined level. Tension on spring 78 may be adjusted as desired by turning nut 84 to compensate for the weight of water reservoir pan 24 and its contents, thereby maintaining valve seating member 52 in a substantially balanced position against nozzle 64. It also may be desirable to adjust the tension of spring 78 in accordance with the water pressure at nozzle 64, a high pressure resulting in less tension being required by the spring.

A suitable number (two being shown) of generally T-shaped evaporator plates 86 of any suitable evaporator plate material have a base leg 88 slidingly fitting in substantially vertical channels 90 provided on the inner sides of reservoir pan 24. Legs 88 of the evaporator plates dip into the water in reservoir pan 24 and act as wicks to transmit water over the surfaces of the plates 86 whereby the evaporating rate of water from reservoir pan 24 can be varied in accordance with the demands of the heating system by varying the number of evaporator plates used.

In operation of the humidifier of this invention, the weight of water at a predetermined level in reservoir pan 24 tilts support bracket 36 to a position to urge valve seating member 52 against water discharge nozzle 64 to shut off the supply of water. This condition is maintained until enough water has been evaporated from reservoir pan 24 for the tensioned balance spring 78 to tilt support bracket 36, reservoir pan 24 and valve seating member 52 toward the greatly exaggerated position as shown by the phantom lines 10 in FIGURE 1, thereby moving valve seating member 52 slightly away from nozzle 64 so that water is discharged into the pan 24 until the added weight at the predetermined water level tilts valve seating member 52 back against nozzle 64 to shut off the supply of water. In general, the water level in water reservoir pan 24 will vary between ½ and ¾ inch from the bottom thereof, the minimum being ½ inch and the maximum 1 inch for satisfactory operation.

Ability to maintain a nearly constant level of water in the reservoir under the wide range of water supply pressures encountered in the field has been a problem of great importance to all manufacturers of humidifiers and one which has heretofore not been solved on the so-called "tilt-type" or counterbalanced humidifier. In order to understand what has been accomplished by my invention, it is necessary to explain the problem and give comparative data obtained under identical test conditions on various well known competitive units.

It is well-known that water supply pressures vary widely in different parts of the country. Normal water pressure in one community may be 30 pounds per square inch. Normal pressure in another area may be 100 pounds per square inch. What is not well-known, however, is how widely these so-called normal pressures may vary from time to time on a single humidifier installation. Thus on some systems ordinarily carrying 30 pounds pressure, it is common to have the pressure drop to 10 pounds, or under emergency conditions such as prompted by a fire in the community, to suddenly run up to over 100 pounds.

Low pressures cause little actual trouble other than probable temporary failure in humidification. However excessive pressure, beyond what the humidifier valve can control, results in immediate overflow with probable water damage, or at least water over the floor. Later, in efforts to remedy a condition which no longer exists, the uninformed home owner may tinker with the unit and probably put it entirely out of adjustment, or in exasperation turn off the water supply. Conditions were encountered in one community where normal water pressure was 60 pounds, but each night while refilling a new reservoir on a hill the pressure mounted to 120 pounds. Over three hundred humidifiers failed, extensive special servicing was required, and many had to be removed with serious loss to all concerned.

In addition to variation in so-called normal pressures there is also the condition of a wide difference in pressures at a given time in homes on the same system. In hilly communities pressure at an elevated spot near the reservoir may be 30 pounds. Each 100 feet of elevation produces a 43 pound difference in pressure. Thus a few blocks away in the valley the pressure is much higher. It is not uncommon to find a 200 foot head difference between houses in a valley and adjacent hill.

All of the above emphasizes the importance of producing a humidifier with a single valve and simple adjustment for universal installation and assured reliable operation regardless of the special pressure conditions met in any specific installation. How completely the present invention accomplishes this will be seen on the attached graph FIGURE 17. Any increase in water pressure necessitates a counteracting force sufficient to close the water valve tightly to prevent overflow of the reservoir or pan. If the design is such that overflow once starts it will continue indefinitely and damage will result unless the overflow is connected to a drain which is infrequently the case. However, more weight of water in the reservoir (as indicated by a rise in the water level) under increased water pressure serves to react to close the valve. Thus the most effective humidifier is the one which will reliably operate over the maximum pressure range with a minimum rise in the water level in the pan.

FIGURE 17 expresses comparative results in graph form.

The present invention incorporates a novel combination of elements to provide maximum direct valving action with a minimum increase in weight of water in the pan. Of prime importance toward this end is the location of the support pivot or fulcrum 28 of the pan at the end of the water collecting area so that every drop of water entering the pan will add its weight as a force to directly urge the valve toward closed position.

A commercially available humidifier of the same general type having a support fulcrum near the longitudinal middle of the pan was tested under working conditions and produced the results shown in curve A of FIGURE 17. After being set to close at 30 pounds pressure with one inch of water in the pan, the depth of water rose to 3 inches (which is the depth of their pan) and overflowed at 90 pounds pressure.

Another known type of humidifier on the market operates by water weight against a rubber diaphragm and curve B of FIGURE 17 setting forth results of a test under working conditions shows that with a water depth of ½ inch at 30 pounds pressure, the water level had increased to 1½ inches (in a 2⅛ inch pan) at 130 pounds pressure.

A third commercial humidifier was tested which operated thru a combination of levers leading to an outside valve. With ½ inch water at 30 pounds the water level rose to 1¼ inches (in a 2 inch pan) at 130 pounds pressure as shown in curve C of FIGURE 17.

The foregoing are representative of the humidifier art in commerce today.

The humidifier of the present invention, operating thru a simple counterbalance, with ½ inch water at 30 pounds increased to a total of ¾ inch (in a 2⅛ inch pan) at 130 pounds pressure as shown in curve D of FIGURE 17.

When valve seating member 52 is in a position to open nozzle 64, hood 58 over the acting valve seat surface deflects water being discharged from the nozzle 64 downwardly into the reservoir pan 24. Thus positive filling of reservoir pan 24 is assured because all water from the nozzle 64 is deflected into the reservoir pan 24 with none escaping in the form of a spray to fall outside. Another feature of the valve seating member 52 is that it is slidable up and down on the tongue 54 of spring clip 44. As the valve seating surface which abuts the end of nozzle 64 becomes worn, the valve seating member 52 may be moved upward slightly so that a new seating surface will abut the end of nozzle 64. When all available surface area on one side of the central planar section 56 has been worn, the valve seat member 52 may be removed and reversed so that tongue 54 is inserted in the groove 60 adjacent the worn seating surface. Thus valve member 52 has a much longer usable life span than those valve members having only one seating surface area. Thus valve member 52 in the combination described is novel in that it combines several advantages: (1) It is a single molded member providing a multiplicity of new valve surfaces. (2) It is readily removable for visual inspection and slips on and off readily without necessity of screws or other means of attachment. (3) The recessed flange on each side serves alternately as retainer and water deflector into the reservoir.

The adjustment screw 62 permits positioning of valve seating member 52 in relation to the adjusted position of reservoir pan 24, thereby making it possible to obtain a substantially parallel valve seating surface in relation to the discharge end surface of nozzle 64.

Another feature of the humidifier of this invention is that overflow pan 26 acts as a shield to prevent upwardly moving air currents in the plenum chamber or duct from impinging directly on the bottom of reservoir pan 24 which would tend to upset the balance of the members associated with tiltable support bracket 36 and cause water to be discharged into the reservoir pan 24 when none is needed. The overflow pan 26 also acts as a safety feature if for any reason the reservoir pan 24 should be overfilled. Thus it is not possible for water to accidentally enter the plenum chamber or air duct in which the humidifier is mounted.

Leakage of hot air through adaptor plate 16 is held to a minimum because shield 23 extends adjacent the normal water level inside reservoir pan 24. Thus shield 23 in combination with cover 76 effectively prevents leakage of hot air from the system.

Referring now to FIGURE 15, there is illustrated another embodiment of the humidifier of this invention which operates in exactly the same manner as described hereinabove. The construction is substantially the same as illustrated in FIGURE 1 except for the water supply nozzle, its mounting, and the removable cover. In this embodiment an adaptor plate indicated generally at 100 is rigidly attached to a plenum wall 102 in the same manner as illustrated in FIGURE 1. The adaptor plate 104 has a square recess 106 in which there is a hole 108 through the bottom thereof for mounting a nozzle retainer member indicated generally at 110.

The nozzle retainer member 110 has a square body in which there is a right angle flow passageway 112 therethrough having a jet discharge nozzle 114 threaded in one end thereof and extending axially from the retainer member body and a water supply pipe 116 suitably connected to the other end of the passageway and extending radially of the retainer member body. A threaded stud 118 integral with nozzle retainer member 110 extends therefrom in axial alignment with discharge jet nozzle 114 and is received in the hole 108. A nut 120 threaded on the stud 118 rigidly clamps retainer member 110 to the supporting shield 104, the square recess 106 permitting the pipe 116 to lie substantially flush against the adaptor plate 100. The angle at which water supply pipe 116 extends from the humidifier assembly can be pivotally adjusted to any of three radial positions (namely, vertical or horizontally to left or right) about the longitudinal axis of retainer member 110 by loosening the nut 120 on stud 118, thus simplifying installation of water supply pipe connections. A flexible heat insulating cap 121 may be slipped over nut 120 to reduce heat flow into the valve.

An upper edge of a removable cover indicated generally at 128 has spaced upright tabs 124 formed thereon which are adapted to extend through correspondingly spaced horizontal slots 126 in shield 104 and abut against the back surface thereof to hold the cover in position. An opening 127 is provided through the top of cover 122 between the tabs 124 to accommodate the water supply pipe 116. It should be understood of course that the position of opening 127 will depend upon whether pipe 116 enters through the left or right side of cover 122, or through the top as illustrated. The lower end of cover 128 is secured to the adjacent end of an overflow pan 129 by a screw 130 threaded into a screw clip 132 clamped over the side of the overflow plan. In practice, cover 122, may have three semi-circular tabs (not shown) all cut, but not removed at the three locations where the tube 116 may make its exit. At the time of installation, one such tab is knocked out to correspond to the preferred position of tube 116 on that particular installation.

Lime and related material in solution in the water supply to humidifiers is eventually deposited as solid matter upon evaporation of the water in the unit. The greater the evaporating capacity the faster the lime accumulates and the more frequently manual cleaning of the humidifier is required. Some water carries much lime and cleaning is desirable several times each heating season. Easy cleaning is essential and the present invention facilitates this by design for easy removal of the entire unit and use of a smooth surfaced glass pan which is readily cleaned and does not deteriorate.

Lime in solution is a constant threat to reliable operation because of an entirely different action. Lime will usually remain in solution at room temperatures indefinitely. As the temperature of the water is raised the lime tends to precipitate as a solid and will adhere to surrounding surfaces until clogging results. This is common knowledge as any plumber can prove by pointing out the deposit of lime in hot water tanks and pipes in a system where the cold water pipes remain free of lime deposit. Experience shows that, except under most unusual circumstances, no lime will be precipitated if the water itself (not the surrounding air) remains below 125° F. When the temperature reaches 140° F. lime may precipitate from some waters. Above 140° F. most water will eventually cause trouble which results in clogging of valve parts.

As the usual air temperatures in forced air furnaces runs as high as 175° F. and may go higher with limit controls commonly set at 200° F., it is obvious that trouble is inevitable if water valves are expected to operate reliably inside such furnaces. Such valves are foredoomed to failure. It is therefore an extremely important object of my invention to provide novel means for maintaining water valve and water line temperatures below the minimum described above for assured freedom from lime precipitation.

A limited measure of protection is provided by locating the water valve outside the wall of the furnace chamber proper as shown in FIGURES 1, 2 and 15. Further, hot air circulation is minimized by intervening walls 23 and 104. However, in most installations the air pressure in the furnace during blower operation exceeds atmospheric, so hot air tends to flow outward thru all openings. Therefore cover 128 is provided, held in airtight attachment by screw 130. With no airflow out from the valve chamber, the intervening walls to the furnace proper (while not airtight in themselves) are quite effective in keeping the hot air in the furnace. All this helps but is not a sure solution, as covers may be left loose, and temperatures still become excessive in severe winter weather.

It might be supposed that the cool water entering the valve from the supply line is sufficient for cooling purposes but experience proves otherwise. The rate of flow is low, actually matching the evaporation from the humidifier, and this usually does not exceed one quart per hour. Further this flow may be intermittent, with the water in the valve reaching surrounding temperatures and releasing its lime before the next flow begins.

In view of all of the above, some specific nonfailing means must be supplied to effectively cool the valve and water line all of the time. This has been provided in the invention by establishing a direct and large capacity heat flow path from the valve itself along the waterline to an assured large capacity heat dissipating means outside the humidifier in the relatively cool basement air.

One essential factor in this accomplishment is to keep the valve and tube area inside the cover, and so exposed to the heat, to a minimum. Thus in FIGURE 1 the valved tube 66 is shaped to present minimum area, and in FIGURE 15 valve parts 112 and 114 combine to accomplish the same purpose. Heat insulating cap 121 may be used in extreme cases to further reduce heat flow, but such use is optional.

The length of copper tubing (66 and 116) inside covers 76 and 128 is short but the length of tubing in the outside cool air is much longer to augment the heat dissipating capacity. As this entire tube is supplied as an integral part of the factory assembly it cannot be left off during field installation. Copper being an excellent heat conductor, the outward heat flow is rapid. This is further augmented by using tubing of at least double usual wall thickness as shown in FIGURES 5 and 6 at 68 and in FIGURE 15 at 116A. Ample heat flow capacity is assured.

This must now be followed by ample heat dissipating capacity. As tube 116 is long and heavy it cannot be bent during factory assembly or in packing the unit, with the result that it protrudes excessively which makes packing a problem.

One way of increasing the heat dissipating capacity in the limited space available is shown in FIGURE 16. Here fins 131 have been rolled into the heavy tubing 116' before assembly, the tube itself being rotated while the fins are extruded by pressing a suitable forming tool along the section to be finned.

Another method is shown in FIGURE 18 where the additional length of tube 116B is included in coil form above the cover 128.

Extended tests were conducted upon the exact construction shown in FIGURE 15 to determine the maximum valve temperatures under severe heat conditions. A fine wire thermocouple was inserted downward inside the water tube so that actual water temperatures inside the nozzle area 114 could be accurately determined. Normal water pressures of 40 pounds per square inch were applied during the tests. With furnace temperatures maintained at 175° F. the maximum temperature reached inside the valve was 122° F. Thus by incorporating in the water line to the valve, ample heat flow capacity from the valve plus adequate heat dissipating capacity outside the humidifier, I have provided a novel means of keeping the valve cool and free from line precipitation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description.

What is claimed and desired to be secured by United States Letters Patent is:

1. A humidifier assembly for mounting in a wall aperture of a plenum chamber or a duct comprising an adaptor plate adapted to be secured to the wall of said plenum chamber or duct, said plate having an aperture to be positioned opposite said wall aperture when the plate is mounted on the wall of said plenum chamber or duct, a substantially horizontally disposed overflow pan rigid with said plate and extending through the aperture therein, a substantially vertically disposed support bracket, means in said overflow pan tiltably mounting said support bracket, a liquid receptacle secured on one side of said support bracket and over said overflow pan, a tensioned balance spring operably connected to the opposite side of said support bracket for biasing said support bracket in a direction opposite from that in which it is urged by the weight of said receptacle and its contents, a liquid supply nozzle mounted on said adaptor plate over said reservoir pan and directed toward said support bracket, and a valve seat mounted on said support bracket adjacent but opposite said nozzle, said valve seat being movable directly with said bracket and adapted to close said nozzle when water in the pan attains a predetermined level.

2. The assembly of claim 1 wherein said valve seat is mounted in spaced relation from said support bracket and means are provided for adjusting the space between said support bracket and valve seat.

3. The assembly of claim 1 wherein means are provided for adjusting the tension of said balance spring.

4. A humidifier comprising a substantially vertical support bracket mounted for tiltable movement about a substantially horizontal axis, said support bracket having a lower forwardly extending arm and spaced upper corresponding outwardly extending arms adapted to support a bottom and sides respectively of a water reservoir pan, a reservoir pan supported on said bracket, a spring clip having a pair of spaced legs joining each other at one end, one of said legs being secured adjacent an end opposite from its joined end to said support bracket in a manner adapted to detachably clamp a side of said reservoir pan to said support bracket, a valve seat mounted on and adjacent the end of the other of said legs, a water nozzle having a discharge end opposite said valve seat for supplying water to said reservoir pan, the weight of said reservoir and its contents tilting said support bracket toward said nozzle to move said valve seat to a position to close the discharge end of said nozzle when water in said reservoir pan is at a predetermined level, a balance spring operably connected to said support bracket biasing the support bracket and valve seat in a direction away from said water nozzle when water in said reservoir pan is below said predetermined level to open the discharge end of the nozzle to refill said reservoir pan to said predtermined level at which point the weight of the reservoir pan and its contents tilts said support bracket to a position to close the discharge end of said nozzle.

5. The humidifier of claim 4 in which a screw is threaded through a leg of said spring clip to abut against the opposite leg to provide for adjustment of the width of space between the two legs.

6. A humidifier comprising a water reservoir pan, means mounting said reservoir pan for tiltable movement about a substantially horizontal axis in response to a predetermined water level in said pan, a water nozzle positioned above said reservoir pan, a valve member mounted on the means mounting said reservoir pan and adapted to open and close the discharge end of said nozzle in response to the tiltable movement of said reservoir pan, said valve member comprising a valve seat disposed substantially vertically when in an operative position, and means for vertically adjusting said valve member to position different valve seat areas thereof for engagement with the discharge end of said nozzle.

7. A humidifier comprising a water reservoir pan, means mounting said reservoir pan for tiltable movement about a substantially horizontal axis in response to a predetermined water level in said pan, a substantially horizontally disposed water nozzle positioned above said reservoir pan, a reversible valve member adapted to open and close the discharge end of said nozzle, said reversible valve member comprising a planar section forming a valve seating surface on opposite sides thereof, said seating surfaces being disposed in a substantially vertical plane when in an operative position, a pair of hoods extending outwardly from the top and sides of said planar section in opposite directions, a groove in the underside of each of the hoods adjacent said planar section, means including a tongue carried by said reservoir and slidably fitting in one of said grooves for mounting said valve member with one side of said planar section against said nozzle when the water level in said reservoir is at a predetermined level.

8. A humidifier assembly for mounting in a wall aperture of a plenum chamber or duct of a hot air furnace, an adaptor plate adapted to be secured to the wall of said plenum chamber or duct, an aperture in said daptor plate opposite said wall aperture when the adaptor plate is mounted on the wall of said plenum chamber or duct, a substantially horizontally disposed overflow pan rigid with said adaptor plate and extending through the aperture therein, means in said overflow pan mounting a tiltable substantially vertically disposed support bracket, means for detachably securing a water reservoir pan on one side of said support bracket and over said overflow pan, a shield on said adaptor plate extending transversely across the inside of said water reservoir pan and downwardly to a position closely adjacent the bottom of the reservoir pan, a tensioned balance spring operably connected to a side of said support bracket opposite from the side on which said reservoir pan is secured for biasing said support bracket in a direction opposite from that in which it is urged by the weight of said reservoir pan and its contents, a substantially horizontally disposed water nozzle mounted on said adaptor plate over said reservoir pan and directed toward said support bracket, means mounting a valve seat on said support bracket adjacent an upper end thereof and opposite from said nozzle, said valve seat being adapted to close said nozzle when water in the pan is filled to a predetermined level.

9. A humidifier assembly comprising a counter-balanced tiltably mounted receptacle, a nozzle having a discharge end for supplying water to said receptacle, valve seat means adapted to abut and close the discharge end of said nozzle in response to a predetermined water level in said receptacle, a stationary nozzle retainer member having a flow passageway therethrough connecting with said nozzle, means mounting the nozzle on said retainer member, a water supply pipe connected to the flow passageway of said retainer member, a threaded mounting stud on said retainer member extending therefrom at substantially right angles to said water supply pipe, support means having a hole therethrough for receiving said stud, and a nut threaded on said stud rigidly clamping said retainer member to said support means, said stud permitting pivotal adjustment of said water supply pipe about the axis of said retainer member.

10. A counterbalanced humidifier assembly comprising an evaporator receptacle tiltably mounted at one end on a substantially horizontal axis and having an open top, said axis being located below said receptacle, a relatively stationary discharge conduit having an open end located above said top near said one end providing a substantially horizontal discharge opening, a valve member secured to said receptacle at said one end and adapted to engage said discharge opening, and means including balancing spring means biasing said receptacle to tilt in a direction to move said valve member away from said opening, the weight of said receptacle and contents serving to tilt said receptacle to forcibly directly engage said valve member with said conduit end to close said discharge opening when a desired liquid level is attained in the receptacle and to permit said spring means to oppositely tilt the receptacle when said level falls.

11. A counterbalanced humidifier assembly comprising a support mounted for tilting about a substantially horizontal axis, an open-top evaporator receptacle removably mounted adjacent one end upon said support above the pivot axis and extending generally horizontally away from said pivot axis, a relatively stationary liquid discharge conduit extending to dispose its open end adjacent the open top of said receptacle, spring means connected to the support for balancing the weight of said receptacle and its contents, means for adjusting said spring means for determining the maximum liquid level in said receptacle, a valve member carried by said support adapted to forcibly engage directly and close said open end of the conduit whenever said receptacle contains a predetermined amount or more of liquid to be evaporated, said spring means tilting the support to uncover said open end of the conduit to permit liquid flow into the receptacle whenever the liquid in the receptacle falls below a desired level, and means for adjusting said valve member toward and away from said one end of the discharge conduit.

12. In the humidifier defined in claim 6, a hood extending outwardly from the top and sides of said valve seat, the hood being disposed over the discharge end of the nozzle in a manner to deflect water discharged therefrom downwardly into said reservoir pan when the valve member opens the water nozzle.

13. In a counterbalanced humidifier assembly, an open top evaporator receptacle mounted at one end to tilt about a generally horizontal axis, a relatively stationary liquid discharge nozzle disposed to supply fluid to said receptacle adjacent said one end, a valve member for engaging said nozzle, a substantially U-shaped spring mount having one leg secured to the receptacle and the other leg mounting said valve member adjacent the nozzle, and balancing spring means biasing said receptacle to tilt in a direction to move said valve member to uncover said discharge nozzle, said receptacle tilting in the opposite direction when a desired liquid level is reached therein to engage said member with said nozzle.

14. In the humidifier defined in claim 13, means extending between said legs adjustable for positioning the valve member with respect to said nozzle.

15. A humidifier assembly comprising a support, a bracket pivoted at its lower end about a substantially horizontal axis on said support, an open top liquid receptacle removably mounted on said bracket above said axis and projecting laterally so that the major portion of said receptacle is disposed at one side of said pivot axis and tends to rock the bracket in one direction about said axis, means in said receptacle for supporting a plurality of side by side evaporation plates, a biasing spring attached to said bracket at the other side of said pivot axis tending to rock said bracket in the opposite direction about said axis, a conduit for supplying liquid to said receptacle and having a discharge mouth disposed over the open top of said receptacle, and valve means mounted on the upper end of said bracket and directly engageable with said mouth, said valve means being moved in response to the position of said receptacle for directly controlling discharge of liquid from said conduit mouth into said receptacle and maintaining a desired liquid level in said receptacle.

16. In a humidifier assembly, a counterbalanced tilting receptacle assembly adapted to contain liquid to be evaporated and comprising an open top receptacle and a support attached to one end of said receptacle and rockably mounted about a horizontal axis disposed below said receptacle, a liquid supply nozzle having an outlet disposed above said receptacle for discharging liquid substantially horizontally, a valve seat element adapted to engage the outlet of said nozzle when a predetermined amount of liquid is in said receptacle, a mount for said valve seat element fixed to said support and having a vertically extending tongue disposed above said receptacle adjacent said outlet, and means slidably supporting said valve seat element for adjustment along said tongue in a direction transversely of the discharge outlet of said nozzle whereby different area portions of said valve seat element may be disposed opposite the discharge outlet of said nozzle.

References Cited in the file of this patent
UNITED STATES PATENTS

| | | |
|---|---|---|
| 1,584,298 | Jacob | May 11, 1926 |
| 1,706,903 | Smith et al. | Mar. 26, 1929 |
| 2,487,267 | Norland | Nov. 8, 1949 |
| 2,541,622 | Toadvine | Feb. 13, 1951 |
| 2,573,158 | Muth et al. | Oct. 30, 1951 |
| 2,709,427 | Perlman | May 31, 1955 |
| 2,784,735 | Barr et al. | Mar. 12, 1957 |
| 2,831,497 | Skerritt | Apr. 22, 1958 |
| 2,839,279 | Harris et al. | June 17, 1958 |
| 2,845,057 | Skerritt | July 29, 1958 |
| 2,845,944 | Bock | Aug. 5, 1958 |
| 2,849,020 | Goff | Aug. 26, 1958 |
| 2,870,762 | Skerritt | Jan. 27, 1959 |